United States Patent [19]

Thomason

[11] Patent Number: 5,469,933
[45] Date of Patent: Nov. 28, 1995

[54] VEHICLE MOUNTED LADDER

[76] Inventor: John Thomason, P.O. Box 1641, 600 E. Sandy Lake Rd., Ste. 120, Coppell, Tex. 75019

[21] Appl. No.: 299,747

[22] Filed: Sep. 1, 1994

[51] Int. Cl.$^6$ ....................................................... E06C 5/00
[52] U.S. Cl. ............................ 182/127; 182/68; 224/310
[58] Field of Search ................................ 182/127, 68, 97; 224/310

[56] References Cited

U.S. PATENT DOCUMENTS

| | | | |
|---|---|---|---|
| 2,586,531 | 2/1952 | Gordon | 182/127 |
| 2,840,290 | 6/1958 | Roberts | 182/127 X |
| 2,946,397 | 7/1960 | Berberick | 182/127 |
| 3,672,549 | 6/1972 | Chorey | 187/127 X |

Primary Examiner—Alvin C. Chin-Shue
Attorney, Agent, or Firm—Arthur F. Zobal

[57] ABSTRACT

The apparatus includes mounting brackets which are secured to the roof of a vehicle. Two elongated tubes are mounted parallel to each other extending lengthwise above the roof on the mounting brackets. An elongated support is slidably located in each tube. The supports each comprise a front section pivotally coupled to a rear section with the legs of the ladder pivotally coupled to the rear sections. The ladder and the supports cooperatively slide between a storage position and an operating position. In the storage position the supports are located substantially in the elongated tubes and the ladder is located on the mounting brackets. In the operating position, the supports are located substantially out of the tubes rearward of the vehicle with the front sections supported by the tubes and the rear sections moved and locked to a vertical position with their lowered ends supported by the ground. The ladder then may be pivoted against a building, etc., rearward of the vehicle while supported by the rear sections.

16 Claims, 7 Drawing Sheets

VEHICLE MOUNTED LADDER

BACKGROUND OF THE INVENTION

1. Field of the Invention

The invention relates to a ladder carried by a vehicle.

2. Description of the Prior Art

It is often desirable to have a ladder carried by a vehicle readily available for use to perform tasks at different geographical locations. A ladder may be carried by a vehicle with side mounting hooks or a top bracket. However, manipulation of a long ladder on and off side mounting hooks or a conventional roof bracket is unwieldy, particularly for one person.

SUMMARY OF THE INVENTION

It is an object of the invention to provide a roof mounted apparatus for a vehicle for carrying a ladder on the top of a vehicle which allows the ladder to be readily removed for use and, after use, readily mounted to the roof mounted apparatus.

It is a further object of the invention to provide a roof mounted apparatus for a vehicle including a slidable section to which a ladder is pivotally coupled and which allows the ladder to be supported rearward of the vehicle for use at a position sufficient to allow rear doors of the vehicle to be opened and closed while the ladder is in use.

The apparatus includes mounting brackets which are secured to the roof of the vehicle. Two elongated tubes are mounted parallel to each other extending lengthwise about the roof on the mounting brackets. An elongated support is slidably located in each tube. The supports each comprise a front section pivotally coupled to a rear section with the legs of the ladder pivotally coupled to the rear sections. The ladder and the supports cooperatively slide between a storage position and an operating position. In the storage position the supports are located substantially in the elongated tubes and the ladder is located on the mounting brackets. In the operating position, the supports are located substantially out of the tubes rearward of the vehicle with the front sections supported by the tubes and the rear sections moved and locked to a vertical position with their lower ends supported by the ground. The ladder then may be pivoted against a building, etc., rearward of the vehicle while supported by the rear sections.

DESCRIPTION OF THE PREFERRED EMBODIMENT

Figure 1:
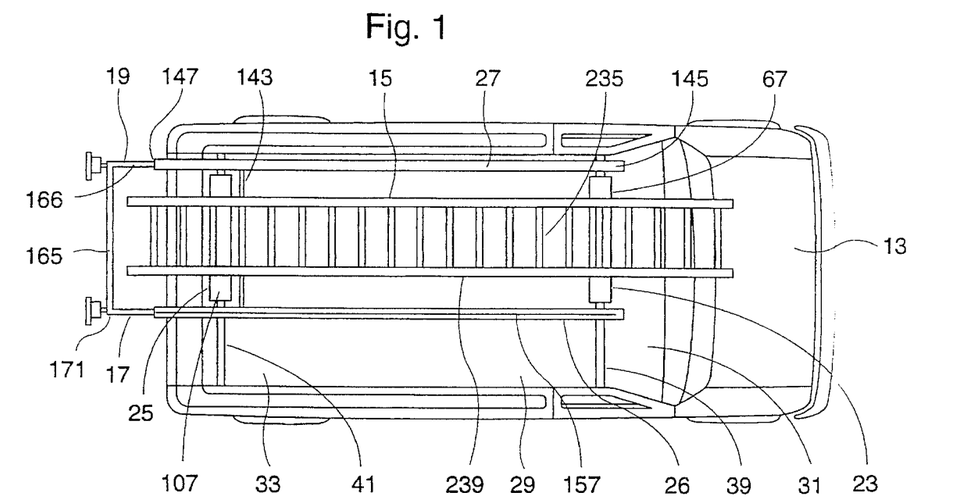
FIG. 1 is a top view of a vehicle having the ladder apparatus of the invention mounted thereon, where the apparatus is located in a storage position.
Figure 2:
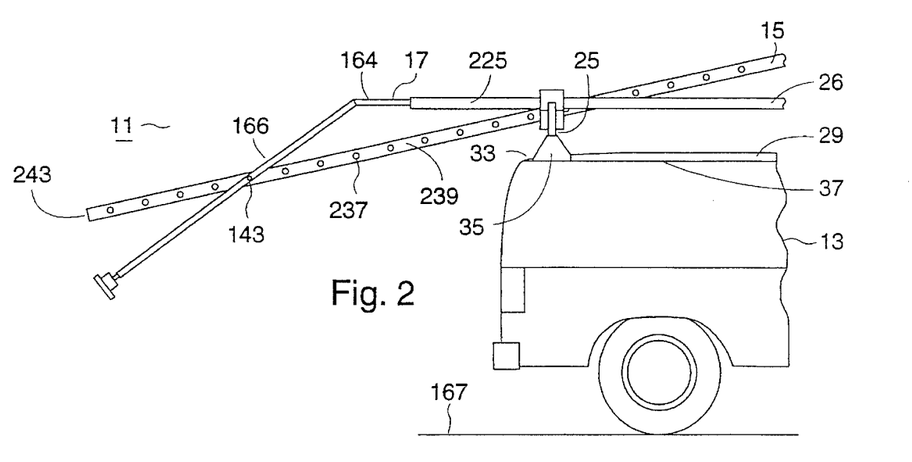
FIG. 2 is a side view of the rear end of the ladder apparatus and vehicle with the apparatus in a partially extended position.
Figure 3:
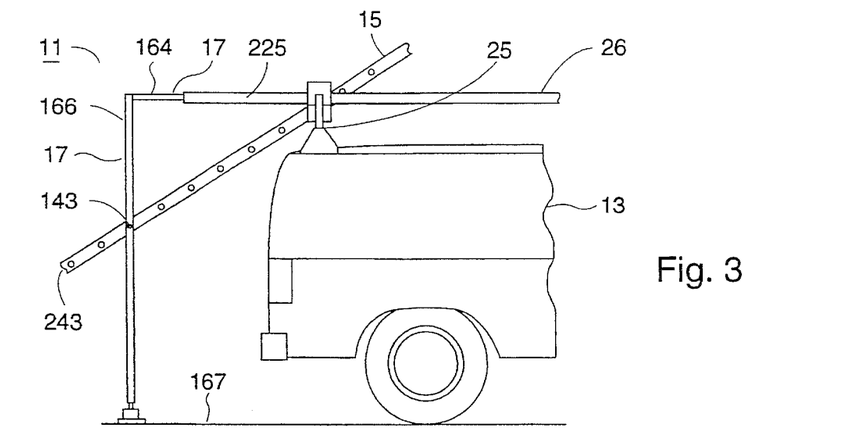
FIG. 3 is a side view of the rear end of the ladder apparatus and vehicle with the ladder supports of the apparatus located in an extended position.
Figures 4, 5:
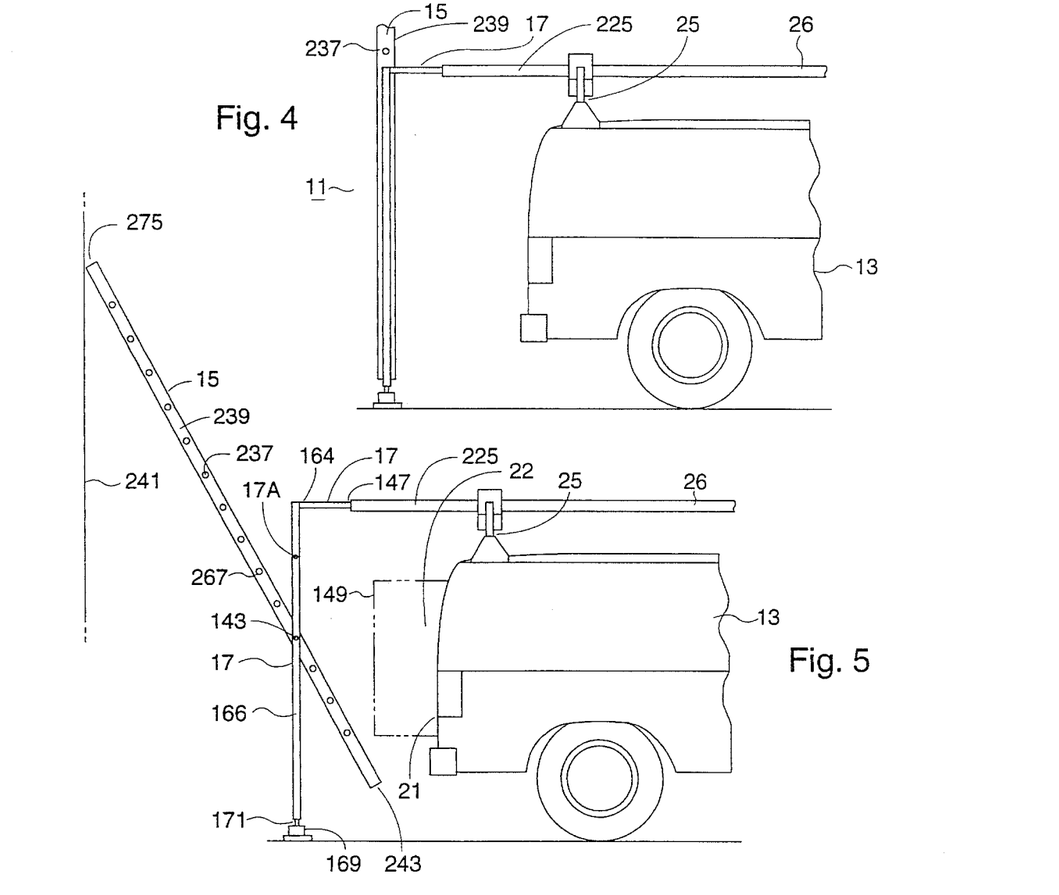
FIG. 4 is a side view of the rear and of the ladder apparatus and vehicle with the ladder located in an upright position between the ladder supports in their extended position.
FIG. 5 is a side view of the rear end of the ladder apparatus and the vehicle with the ladder apparatus in a operating position.

Referring now to FIGS. 1–5, the ladder apparatus 11 of the present invention is shown secured to a vehicle 13. The ladder apparatus 11 is supported on the roof of the vehicle 13 in a storage position as shown in FIG. 1 until the ladder apparatus 11 is required. As shown in FIGS. 1–5, a ladder 15 and ladder supports 17 and 19 are cooperatively moved from their storage position on the vehicle 13 to position the ladder 15 in an operative location behind the vehicle 13. In the operative position of the apparatus 11, as shown in FIG. 5, the ladder 15 and the ladder supports 17 and 19 are located a sufficient distance behind the rear 21 of the vehicle 13 to allow the rear door 22 of the vehicle 13 to be fully opened to provide access into the vehicle 13. After the ladder apparatus 11 has been used, the ladder 15 and ladder supports 17 and 19 may be slidably returned to their storage position on the vehicle.

Referring now to FIG. 1, the ladder apparatus 11 includes the ladder 15, ladder supports 17 and 19, tubes 26 and 27 for slidably retaining the ladder supports 17 and 19, respectively, and mounting brackets 23 and 25 for supporting the tubes 26 and 27 and the ladder 15 on the vehicle 13. The mounting brackets 23 and 25 are coupled to the roof 29 of the vehicle 13 at the front 31 and rear 33 of the vehicle roof 29, respectively. The ladder 15 is removably located on the mounting brackets 23 and 25 between the tubes 26 and 27. The tubes 26 and 27 are maintained in a parallel relationship extending lengthwise over the vehicle roof 29 by the mounting brackets 23 and 25. The ladder supports 17 and 19 extend in the tubes 26 and 27, respectively parallel to the ladder 15 and the ladder 15 is pivotally coupled to the supports 17 and 19. The ladder supports 17 and 19 slide substantially out of the tubes 26 and 27, respectively, when the ladder 15 is removed from the mounting brackets 23 and 25, and, as shown in FIGS. 2–4, the ladder supports 17 and 19 and ladder 15 cooperatively move between their storage positions (FIG. 1) and their operative positions (FIG. 5).

Figure 20:
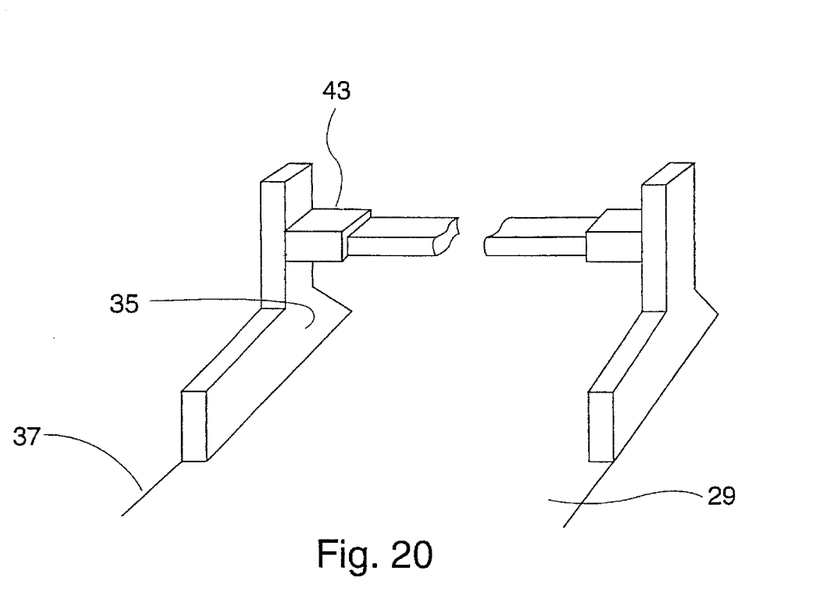
FIG. 20 is an isometric view of coupling members and a mounting bar of a mounting bracket.

The mounting brackets 23 and 25 secure the device 11 to the vehicle roof 29 as shown in FIGS. 1, 2, and 20. The mounting bracket 25 includes coupling members 35 which couple the mounting bracket 25 to the sides 37 of the vehicle roof 29 near the rear 33 of the vehicle roof 29. The mounting bracket 23 has similar coupling members 35 which couple the mounting bracket 23 to the sides 37 of the vehicle roof 29 near the front 31 of the vehicle roof 29. In a preferred embodiment, the coupling members 35 are metal brackets bolted to the roof 29 of the vehicle 13.

Figure 7:
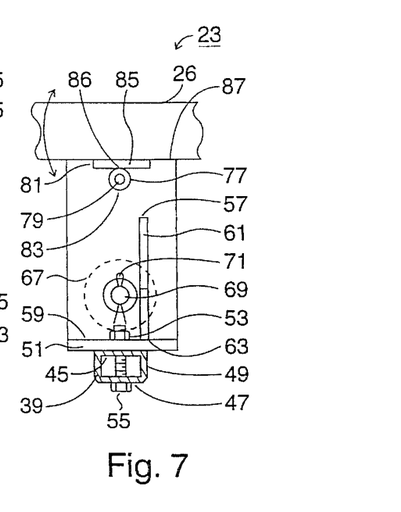
FIG. 7 is a side view of the central portion of the front mounting bracket.
Figure 9:
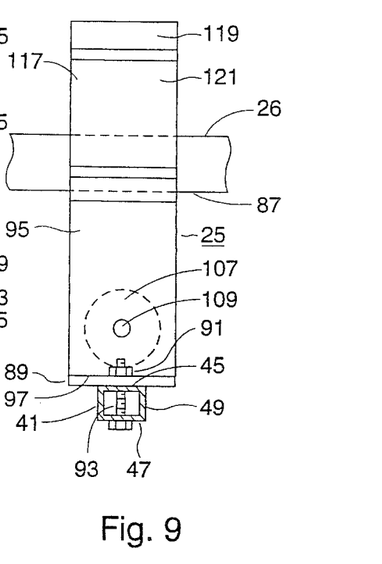
FIG. 9 is a side view of the central portion of the rear mounting bracket.

Referring still to FIG. 1, the mounting brackets 23 and 25 have mounting bars 39 and 41, respectively, mounted on the vehicle 13 extending across the roof 29 of the vehicle between the coupling members 35. As shown in FIG. 20, the mounting bars 39 and 41 are secured to the coupling members 35 in sleeves 43 of the coupling members 35 that extend inwardly from the sides 37 of the vehicle roof 29 above the roof 29. As shown in FIGS. 7 and 9, the mounting bars 39 and 41 are tubular rectangular members having upper, lower, and slide walls 45, 47 and 49. In a preferred embodiment, the mounting bars 39 and 41 are formed of a durable metal material such as steel, iron, or aluminum.

Figure 6:
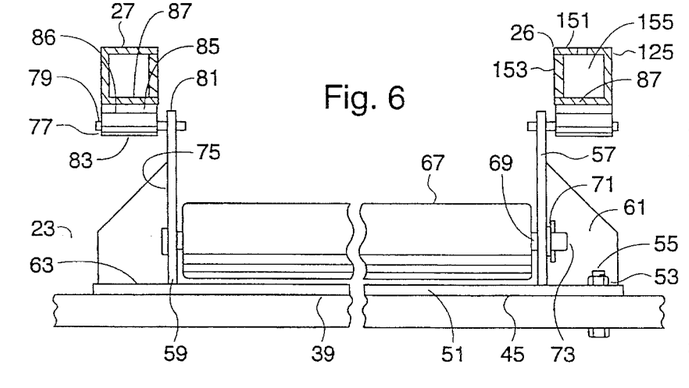
FIG. 6 is a rear view of a central portion of the front mounting bracket of the ladder apparatus.

Referring now to FIGS. 6 and 7, the central portion of the front mounting bracket 23 is shown. A base plate 51 is mounted centrally on the upper wall 45 of the mounting bar 39 and is secured to the mounting bar 39 with nuts 53 and bolts 55. Two spaced apart parallel arms 57 and extend upwards from the base plate 51 and are secured to the base plate 51 on the bottom edges 59 of the arms 57. The arms 57 are spaced apart from each other a sufficient distance to accommodate the width of the ladder 15 comfortably therebetween. Each arm 57 is formed of a durable metal plate.

Arm supports 61 are secured along the forward edge of the base plate 51 extending upwards abutting each arm 57. Each arm support 61 is formed of a durable metal plate secured to the base plate 51 along a bottom edge 63 and secured to a respective arm 57 along a side edge 65. The arm supports 61 provide structural strength to the mounting bracket 23. In a preferred embodiment the base plate 51, arms 57 and arm supports 61 are welded together.

A cylindrical roller 67 is rotatably secured between the arms 57 of the front mounting bracket 23 for rotatably supporting the ladder 15 thereon. A roller pin 69 extends through the roller 67 along the longitudinal axis of the roller 67 about which the roller 67 may rotate. The roller pin 69 extends transversely between the arms 57 and extends through each arm 57 to hold the roller 67 between the arms 57 slightly above the base plate 51. The roller 67 has a length greater than the width of the ladder 15 so the roller 67 may support the ladder 15 thereon. The distance between the arms 57 is slightly greater than the length of the roller 67 so the roller 67 may freely rotate between the arms 57 on the roller pin 69. Roller pin caps 71 are located about the ends 73 of the roller pin 69 adjacent the outer face 75 of each arm 57 to secure the roller pin 69 and the roller 67 between the arms 57.

Tube mounts 77 are coupled to the arms 57 for pivotally supporting the tubes 26 and 27 above and outside the roller 67. A pivot pin 79 is coupled to each arm 57 near the top 81 of the arm 57 extending outward from the arm 57 away from the roller 67. A cylindrical pivot roller 83 is rotatably secured about each pivot pin 81 with the pivot pin 81 extending through the longitudinal axis of the pivot roller 83 along the length of the pivot roller 83. A mounting plate 85 is coupled to the apex 86 of each pivot roller 83. The mounting plates 85 are fastened to the bottom walls 87 of the tubes 26 and 27. As shown in FIG. 7, the tubes 26 and 27 pivot vertically about the tube mounts 77 so that the tubes 26 and 27 may be jostled to aid in removal of the ladder supports 17 and 19 from the tubes 26 and 27 respectively.

Figure 8:
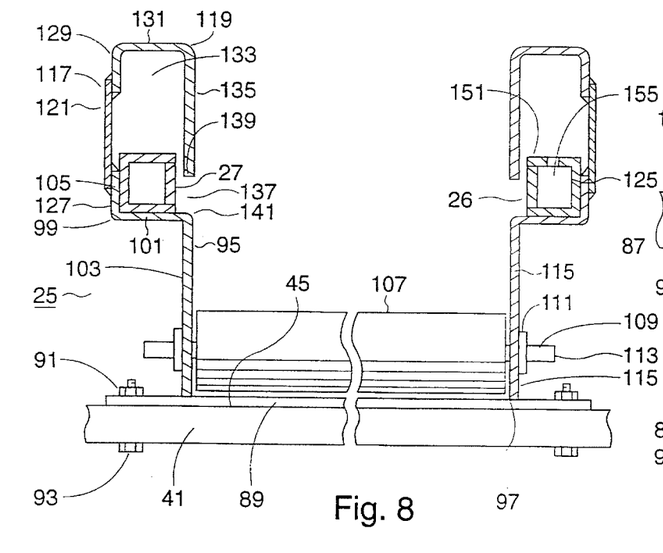
FIG. 8 is a rear view of a central portion of a rear mounting bracket of the ladder apparatus.

Referring now to FIGS. 8 and 9, the central portion of the rear mounting bracket 25 is shown. A base plate 89 is mounted centrally on the upper wall 45 of the mounting bar 41 and is secured to the mounting bar 41 with nuts 91 and bolts 93. As shown in FIG. 1, the mounting brackets 23 and 25 are aligned on the vehicle roof 29 so that the ladder and tubes 26 and 27 extend perpendicular between the mounting brackets 23 and 25.

Referring back to FIGS. 8 and 9, two spaced apart parallel arms 95 extend upwards from the base plate 89 secured to the base plate 89 at the bottom edges 97 of the arms 95. The arms 95 are coupled to the mounting bar 41 spaced apart a sufficient distance to accommodate the width of the ladder 15 comfortably therebetween. The arms 95 have a flanged portion 99 located at the upper end of the arms 95 on which the tubes 26 and 27 are supported. The flanged portions 99 have a base 101 extending transverse to the body 103 of the arms 95 on which the tubes 26 and 27 rest, and a lip 105 which retains the tubes on the arms 95. Each arm 95 is formed of a durable, bent metal plate.

A cylindrical roller 107 is rotatably secured between the arms 95 of the rear mounting bracket 25 for rotatably supporting the ladder 15 thereon. A roller pin 109 extends through the roller 107 along the longitudinal axis of the roller 107 about which the roller 107 may rotate. The roller pin 109 extends transversely between the arms 95 and extends through each arm 95 to hold the roller 107 between the arms 95 slightly above the base plate 51. The roller 107 has a length greater than the width of the ladder 15 so the roller 107 may support the ladder 15 thereon. The distance between the arms 95 is slightly greater than the length of the roller 107 so the roller 107 may rotate between the arms 95 on the roller pin 109. Roller pin caps 111 are coupled about the ends 113 of the roller pin 109 adjacent the outer face 115 of each arm 95 to secure the roller pin 109 and the roller 107 between the arms 95.

The tubes 26 and 27 are liftably located in and extend through retaining supports 117 formed at the upper end of the arms 95. The retaining supports 117 hold the tubes 26 and 27 above and outside the roller 107 so the tubes 26 and 27 are located extending adjacent the ladder 15 about the sides of the ladder 15 when the ladder 15 is located on the roller 107.

Each retaining support 117 is formed by the flanged portion 99 of the arm 95, an overhang plate 119, and a coupling plate 121. The bottom walls 87 of the tubes 26 and 27 are positioned on the base 101 of the flanged portion 99 of the arms 95 with an outer side walls 125 of the tubes abutting the lip 105 of the flanged portion 99. The coupling plate 121 is coupled to the outer face 127 of the lip 105 and extends upward from the lip 105 to the overhang plate 119. An outer section 129 of the overhang plate 119 is coupled to the coupling plate 121 and extends upwards to an upper section 131 of the overhang plate 119 which extends transverse to the outer section 129 over the tubes 26 and 27. The upper section 131 of the overhang plate 119 is spaced from the tubes 26 and 27 by a gap 133 when the tubes are located on the flanged portion 99 of the arms 95 so the tubes may be lifted within the retaining support 117 to jostle the ladder supports 17 and 19 out of the tubes. An inner section 135 of the overhang plate is 119 integrally coupled to the upper section 131 and extends downwards parallel to the outer section 129 and coupling plate 121, with the tubes 26 and 27 located within the inner section 135, the upper section 131, the outer section 129, the coupling plate 121 and the flanged portion 99 of the arms 95. A gap 137 is located between the lower end 139 of the inner section 135 and the inner edge 141 of the flanged portion 99 so that a pivot bar 143 (see FIG. 1) may extend from the tubes 26 and 27 through the retaining support 117. In a preferred embodiment, the overhand plate 119, the coupling plate 121 and the flanged portion 99 are welded together.

Referring now to FIGS. 1 and 2, the tubes 26 and 27 are mounted on the mounting brackets 23 and 25 extending lengthwise above the roof 29 of the vehicle 13. The front end 145 of each tube 26 and 27 is located slightly forward of the front mounting bracket 23 and the rear end 147 of each tube 26 and 27 is located past the rear 33 of the vehicle roof 29 positioned above and slightly beyond the end 149 of the rear door 22 of the vehicle 13 when the rear door 22 is open (see FIG. 5). As described above, the tubes 26 and 27 are pivotally mounted on the front mounting bracket 23 and are liftably mounted in the rear mounting bracket 25 so the tubes may be lifted at the rear ends 147 of the tubes to jostle the tubes to free the ladder supports 17 and 19 should the ladder supports become stuck in the tubes.

Referring now to FIGS. 6 and 8, the tubes 26 and 27 are rectangular tubular members formed of a durable metal such as steel, iron or aluminum. Each tube 26 and 27 has integrally coupled top, bottom, inner and outer walls 151, 87 153 and 125 which extend about a cavity 155. The cavity 155 in each tube 26 and 27 extends lengthwise through the tube. The tubes 26 and 27 receive and support the ladder supports 17 and 19, respectively in the cavity 155 of the respective tubes 26 and 27. As shown in FIG. 1, the ladder supports 17 and 19 extend into the tubes 26 and 27, respectively, through the rear ends 147 of the tubes.

Figure 10:
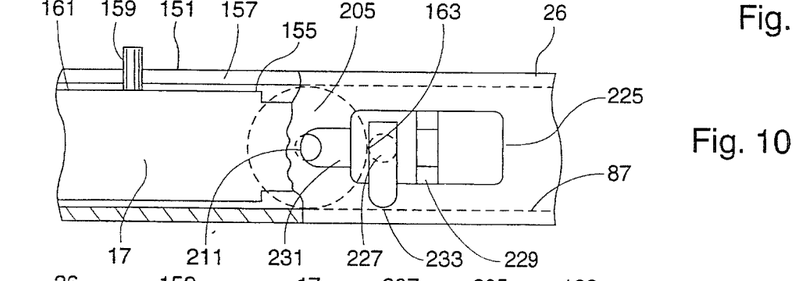
FIG. 10 is a partial cross sectional side view of a right tube of the ladder apparatus with a ladder support located therein positioned adjacent a stop.
Figure 11:
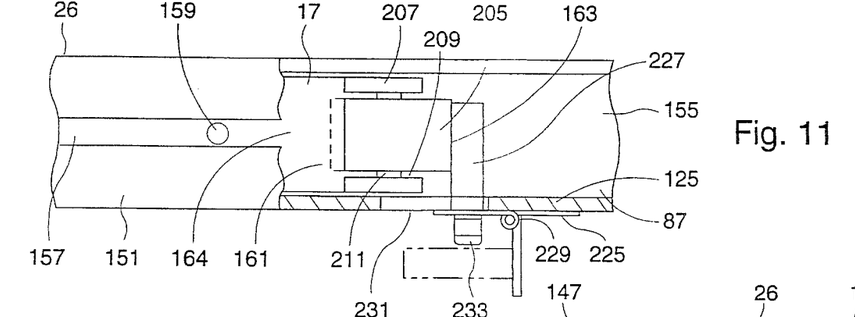
FIG. 11 is a partial cross sectional top view of the right tube with a ladder support located therein positioned adjacent a stop.

Referring now to FIGS. 1, 10 and 11, tube 26 guides the ladder supports 17 and 19 in the tubes 26 and 27 as the ladder supports slide through the tubes. Tube 26 has a guide slot 157 extending lengthwise through the top wall 151 of the tube 26. As shown in FIG. 10, the guide slot 157 communicates with the cavity 155 in the tube 26. Referring to FIGS. 10 and 11, the ladder support 17 has a guide pin 159 coupled to its upper surface 161 near the front end 163 of the ladder support 17. The guide pin 159 extends from the ladder support 17 in the cavity 155 through the guide slot 157 in the tube 26. As shown in FIG. 11, the guide slot 157 is only slightly wider than the diameter of the guide pin 159 so the ladder support 17 is guided by the guide slot 157 and guide pin 159 as the ladder support slides in the tube 26. Referring back to FIG. 1, the ladder supports 17 and 19 are coupled together by a tubular end support bar 165 and by the pivot bar 143 so both ladder supports 17 and 19 are guided in the tubes 26 and 27 by the guide pin 159 and guide slot 157.

As shown in FIGS. 1–3 and 10–12, the ladder supports 17 and 19 are elongated rectangular metal bars sized to slidably fit within the tubes 26 and 27, respectively. Each ladder support 17 and 19 has front and rear sections 164 and 166 that are pivotally coupled together. As shown in FIG. 1, the sections 164 and 166 pivot to a linear position to extend lengthwise through the tubes 26 and 27 when the ladder supports 17 and 19 are located in their storage position. In the storage position, a substantial portion of each ladder support 17 and 19 is located in its respective tube 26 or 27 with a portion of the rear section 166 extending outward from the rear end 147 of the tubes 26 and 27 in position to be grasped to pull the device 11 into its operating position. As shown in FIG. 5, in the operating position the rear section 166 is pivoted to extend at a right angle to the front section 164 with the rear section 166 extending down from the front section 164 to the ground 167. The ladder 15 is supported between the rear sections 166 located on the ground 167. Feet 169 are coupled to the rear ends 171 of the ladder supports 17 and 19 extending linearly outward from the rear section 166 for stabilizing the ladder supports 17 and 19 on the grounds 167.

Figure 21:
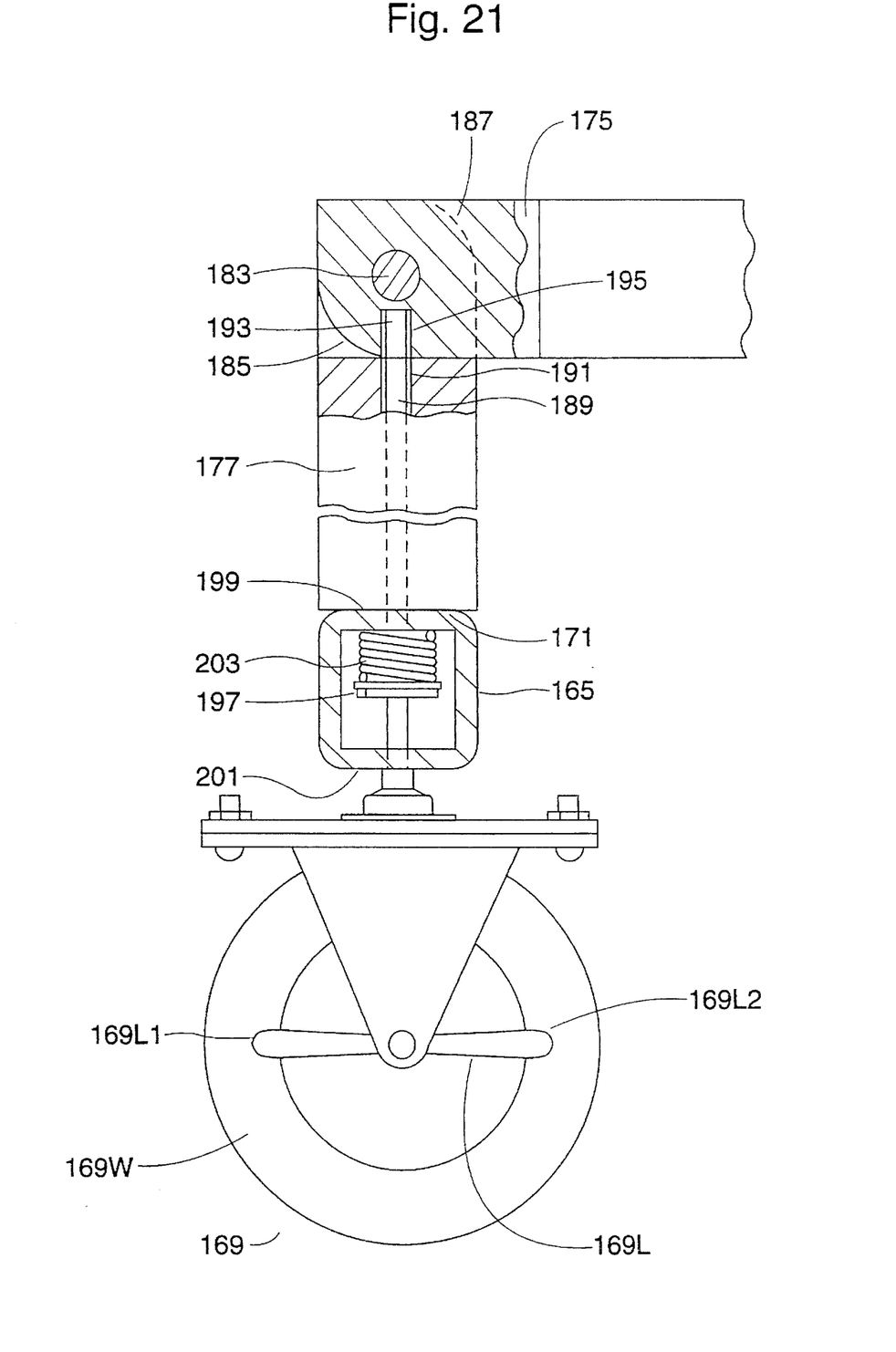
FIG. 21 is a modification of the invention showing a wheel attached to the bottom end of the rear section of the ladder support.

The feet 169 may be either conventional non-slip shoes 169S, as shown in FIG. 1–5 and 13, or wheels, as shown in FIG. 21. In a preferred embodiment, the feet 169 are conventional locking wheels 169W which roll when unlocked and are secured in an immovable position when locked. The wheel feet 169W permit the rear sections 166 of the ladder supports 17 and 19 to be readily pivoted to locate the feet 169W on the ground 167 immediately upon pulling the rear section 166 past the rear 21 of the vehicle 13. The ladder supports 17 and 19 may then be rolled outward on the wheel feet 169W into the operating position. The wheel feet 169W are then locked to prevent the ladder supports 17 and 19 from moving out of the operating position. Use of the wheeled feet 169W enables the ladder supports 17 and 19 to be secured in an operating position at any location selected along the path the ladder supports 17 and 19 are rolled on the feet 169W. The shoe feet 169S also are usable but require the supports 17 and 19 to be lifted or slid to the operating position.

Figures 13, 14, 15, 16:
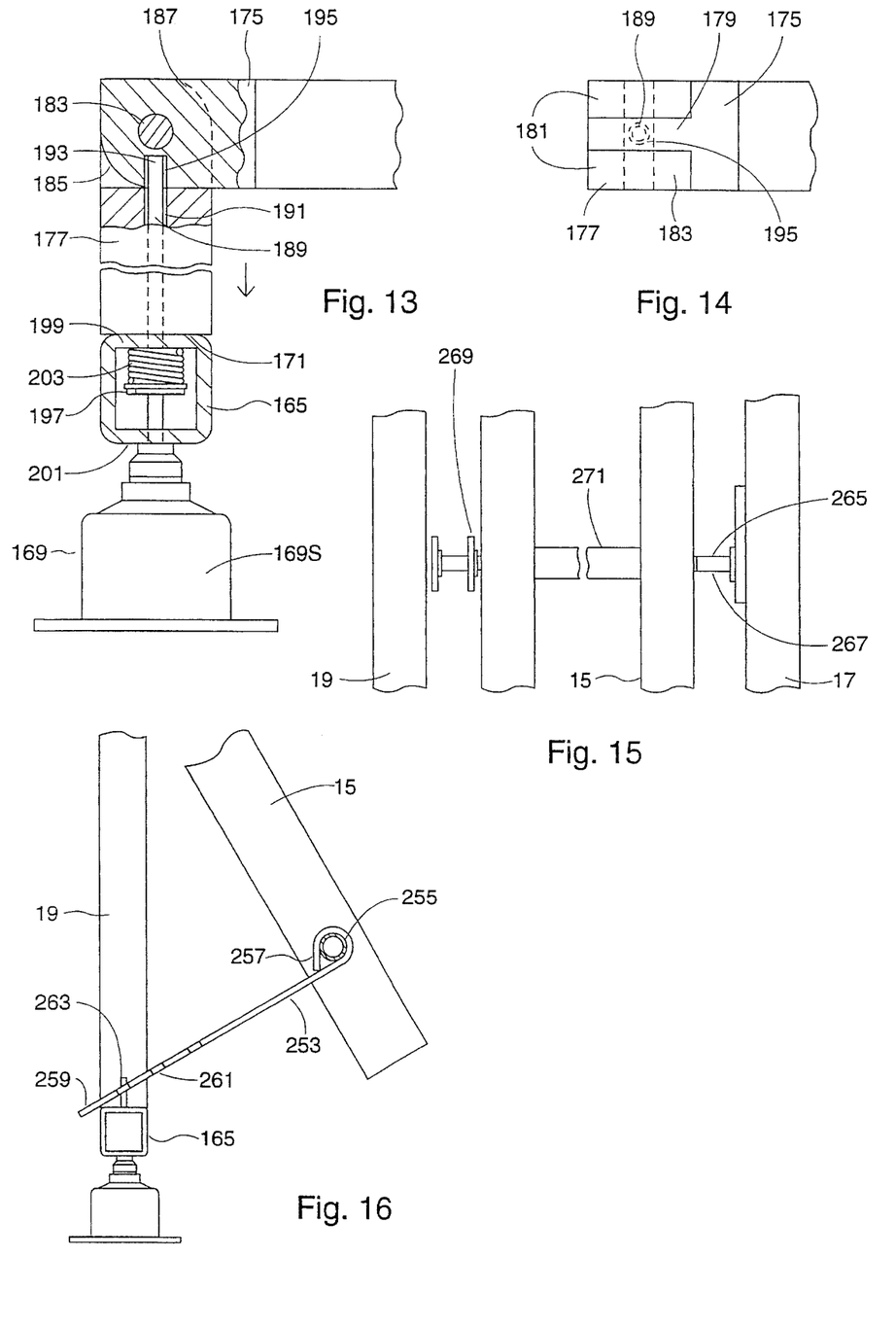
FIG. 13 is a partial cross sectional side view of pivotable front and rear sections of a ladder support in a locked operating position with an end support bar and a foot attached thereto.
FIG. 14 is a top view of coupling ends of the front and rear sections of a ladder support.
FIG. 15 is a front view of a support bar moveably located in the ladder of the ladder apparatus with the ladder located between the ladder supports.
FIG. 16 is a cross sectional side view of a fastening member coupled between a ladder rung and the end support bar.

Referring now to FIG. 1, the tubular end support bar 165 extends transversely between and couples the rear ends 171 of the ladder supports 17 and 19. The end support bar 165 provides structural strength and stabilizes the ladder supports 17 and 19. As shown in FIG. 13 and 21, each foot 169 is coupled to the rear end 171 of a ladder support 17 or 19 through the tubular end support bar 165. In a preferred embodiment, the end support bar 165 is formed of a durable metal and is welded between the ladder supports 17 and 19.

Referring to FIGS. 13 and 14, the front and rear sections 164 and 166 have respective coupling ends 175 and 177 about which the sections 164 and 166 are pivotally coupled. The coupling end 175 of the forward section 164 is generally "T" shaped with the leg 179 of the T-shaped coupling end 175 extending rearward from the front section 164. The coupling end 177 of the rear section 166 is generally "U" shaped with the legs 181 of the U-shaped coupling end 177 extending about the leg 177 of the T-shaped coupling end 175. A pivot pin 183 about which the front and rear sections 164 and 166 may pivot is secured extending through the legs 179 and 181. Edge 185 of coupling end 175 and edge 187 of coupling end 177 are rounded so the sections 164 and 166 may smoothly pivot about the pivot pin 183.

Referring still to FIGS. 13 and 14, the front and rear sections 164 and 166 of each ladder support 17 and 19 lock together when the ladder supports 17 and 19 are pivoted to their operating position to prevent the ladder supports from pivoting out of their operating position while the ladder 15 is being used. A rod 189 extends from each foot 169 through end support bar 165 and lengthwise through a channel 191 in the rear section 166 of each ladder support 17 and 19. The upper end 193 of the rod 189 is located adjacent the coupling end 175 of the front section 164. The coupling end 175 of the front section 164 has a rod receiving aperture 195 which is positioned to receive the rod 189 therein when the sections 164 and 166 are located at right angles and the ladder supports 17 and 19 are located in their operating position. A washer 197 is welded about the rod 189 between the upper and lower walls 199 and 201 of the end support bar 165. A spring 203 is also located about the rod 189 positioned between and abutting the washer 197 and the upper wall 199 of the end support bar 165. The spring 203 biases the washer 197 and the rod 189 away from the front section 164 so the rod 189 does not interfere with the pivot movement of the sections 164 and 166 when the ladder supports 17 and 19 are not located in their operating position. The foot 169 pushes upward on the rod 189, spring 203, and washer 197 when the foot 169 is located on the ground 167, compressing the spring 203 and pushing the upper end 193 of the rod 189 into the rod receiving aperture 195 in the coupling end 175 of the front section 164, locking the sections 164 and 166 at right angles. When the ladder 15 is used further weight is placed on the foot 169 causing the foot 169 to further compress the spring 203, holding the rod 189 in the rod receiving aperture 195. The spring 203 biases the rod 189 away from the coupling end 175 of the front section 164 when the foot 169 is lifted off of the ground 167.

The ladder supports 17 and 19 are slidably located in the tubes 26 and 27, respectively, so the ladder supports may be easily moved between their storage position in the tubes and their operating position located substantially out of the tubes. Referring to FIG. 11, a wheel 205 is coupled to the forward end 207 of the front section 164 of each ladder support 17 and 19 arranged to roll along the bottom wall 87 of the tubes 26 and 27 in which the ladder support is located. The forward end 207 of each front section 164 has a notch 209 therein with an axle 211 coupled to the forward end 207 extending across the notch 209. The wheel 205 is rotatably located on the axle 211 positioned to roll lengthwise along the tube 26 or 27.

Figure 12:
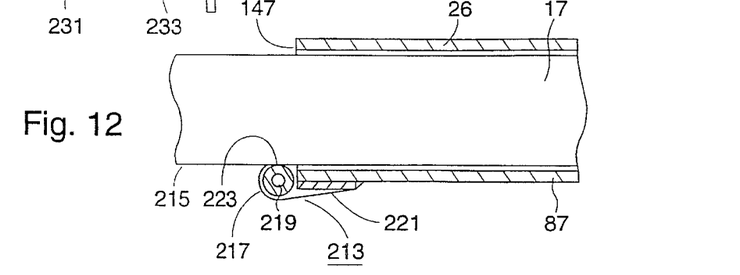
FIG. 12 is a cross sectional side view of the rear end of a tube with a ladder support therein showing a roller at the end of the tube.

As shown in FIG. 12, a roller 213 is coupled to the bottom wall 87 of each tube 26 and 27 extending past the rear end 147 of its respective tube 26 or 27 abutting the lower surface 215 of the ladder supports 17 and 19. The rollers 213 and the wheel 205 cooperatively enable the ladder supports 17 and 19 to smoothly roll through their respective tubes 26 and 27. The roller 213 has a mounting collar 217 which is coupled to the bottom wall 87 of its respective tube 26, 27 extending outward past the rear end 147 of the tube, and extending across the bottom wall 87 between the inner and outer walls 153 and 125 of the tubes. An axle 219 is mounted extending between the sides 221 of the collar 217, and a wheel 223 is rotatably mounted on the axle 219 extending substantially between the inner and outer walls 153 and 125 of the tubes 26 and 27. The wheels 223 are positioned abutting the lower surfaces 215 of the ladder supports 17 and 19 at the position where the ladder supports 17 and 19 exit their respective tubes 26 and 27. The mounting collars 217 hold the wheels 223 against the ladder supports 17 and 19.

Referring now to FIGS. 10 and 11, a hinged stop 225 is coupled to the tube 26. The stop 225 is positioned on the tube 26 to be located abutting the wheel 205 at the front end 163 of the ladder support 17 when the ladder support 17 is located in its extended operating position. Location of the stop 225 against the wheel 205 prevents the ladder supports 17 and 19 from moving forward out of their operating positions in their respective tubes 26 and 27. The stop 225 pivots out of the tube 26 to permit the ladder supports 17 and 19 to slide freely in the tubes 26 and 27.

The stop 225 has a cylindrical bolt 227 which may be positioned against the wheel 205 of the ladder support 17 to prevent the ladder support 17 from moving past the bolt 227 in the tube 26. The bolt 227 has a length sufficient to extend from the outer wall 125 of the tube 26 across the wheel 205. A hinge 229 couples the bolt 227 to the outer wall 125 of the tube 26 so the bolt 227 may be pivoted into and out of the cavity 155 in the tube 26. The hinge 229 may be any conventional hinge capable of swinging the bolt 227 into and out of the tube 26. A bolt slot 231 extends through the tube 26 adjacent the hinge 229 through which the bolt 227 is moved as the bolt 227 is pivoted by the hinge 229. A handle 233 is coupled to the hinge 229 extending outwards from the hinge 229. The handle 233 is positioned to be easily grasped to operate the hinge 229 and the bolt 227.

As shown in FIGS. 1–5, the ladder 15 is a conventional ladder having tubular rungs 235 with rung apertures 237 extending therethrough when the rung apertures 237 extend through the sides 239 of the ladder 15. The ladder is pivotally mounted between the ladder supports 17 and 19 on the pivot bar 143. The ladder 15 is located on the rollers 67 and 107 of the mounting brackets 23 and 25, respectively, when the ladder device 11 is located in the storage position (see FIG. 1). The ladder 15 rolls off the rollers 67 and 107 and pivots about the pivot bar 143 between the ladder supports 17 and 19 as the ladder 15 is moved between its storage position and its operating position (see FIGS. 2–4). In its operating position, the ladder 15 is located a short distance behind the end 149 of the open rear door 22 (shown in dashed lines in FIG. 5) of the vehicle 13 positioned to be placed against a wall 241 extending upwards. The ladder supports 17 and 19 hold the lower end 243 of the ladder 15 slightly above the ground 167.

Figure 17:
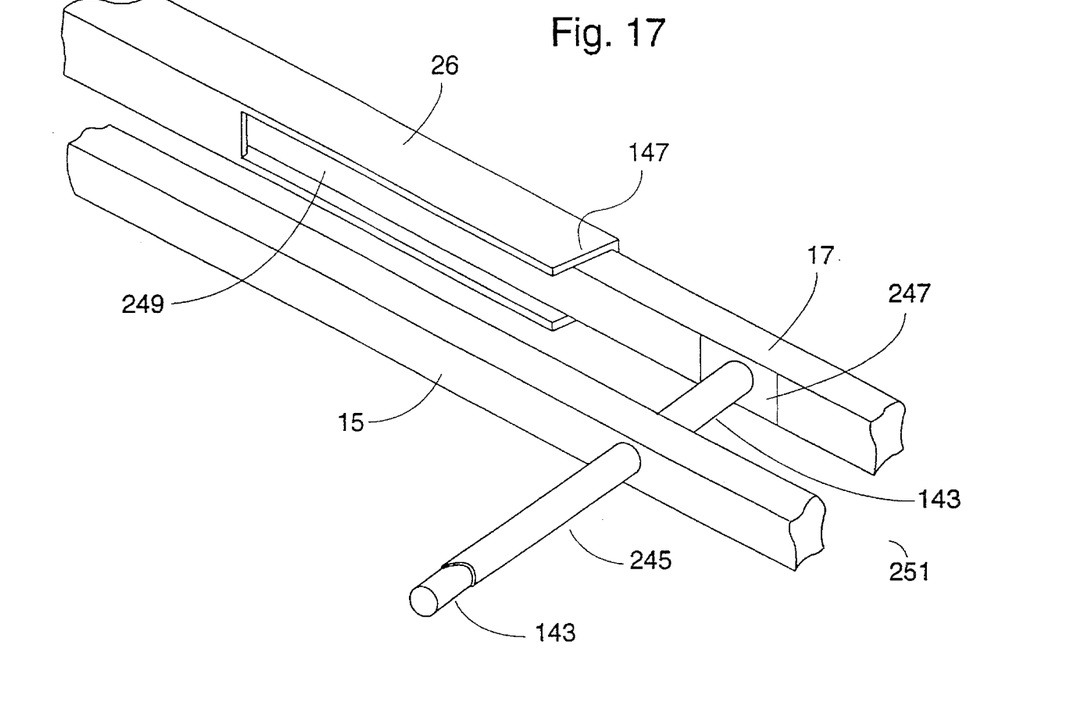
FIG. 17 is an isometric view of a ladder support in a tube coupled to the ladder.

As shown in FIG. 17, the pivot bar 143 is coupled to and extends between sections 166 of the ladder supports 17 and 19. The pivot bar 143 extends through the tubes 26 and 27 and through a pivot rung 245 of the ladder 15. The pivot bar 143 is mounted to each ladder support 17 and 19 in a pivot bar mounting plate 247 which is bolted to its respective ladder support 17 and 19. The pivot bar 143 extends from the ladder supports 17 and 19 through a pivot bar slot 249 in each tube 26 and 27. Each pivot bar slot 249 extends through the inner walls of the tubes 26 and 27 lengthwise along the tubes from the rear ends 147 of the tubes to a position slightly forward of the rear mounting bracket 25. The pivot bar 143 slides along the length of the pivot bar slots 249 as the ladder supports 17 and 19 and the ladder 15 are moved between their storage and operating positions.

The pivot bar 143 extends out of each tube 26 and 27 across a gap 251, between the tubes and the ladder 15 and enters the rung aperture of the pivot rung 245 of the ladder 15. The rung aperture of the pivot rung 245 and the pivot bar 143 are cylindrical, where the rung aperture of the pivot rung has a slightly greater diameter then the pivot bar 143 so the pivot bar 143 may extend through the pivot rung 245 and the ladder may pivot about the pivot bar 143. The ladder 15 pivots about the pivot bar 143 between the ladder supports 17 and 19. The pivot rung 245 of the ladder 15 is located relatively near the bottom of the ladder 15 so the ladder may pivot to extend upwards from the ladder supports 17 and 19.

As shown in FIG. 16, the ladder 15 may be supported in its operating position by a fastening member 253. The fastening member 253 extends between the lowest ladder rung 255 and end support bar 165 to secure the ladder 15 in its operating position. The fastening member 253 has a hooked end 257 which is securely looped about the ladder rung 255. The opposite end 259 of the fastening member 253 has a series of pin apertures 261 extending through the fastening member 253 lengthwise along the member 253. The end support bar 165 has an upwardly extending pin 263 which fits into a pin aperture 261 of the fastening member 253. The pin 263 of the end support bar 173 is located in a selected pin aperture 261 to secure the ladder 15 to the end support bar 165 at a desired angle. To prepare the ladder 15 to be moved from its operating position to its storage position the fastening member 253 is removed from between the ladder 15 and end support bar 165 by lifting the fastening member 253 off of the pin 263.

Figure 18:
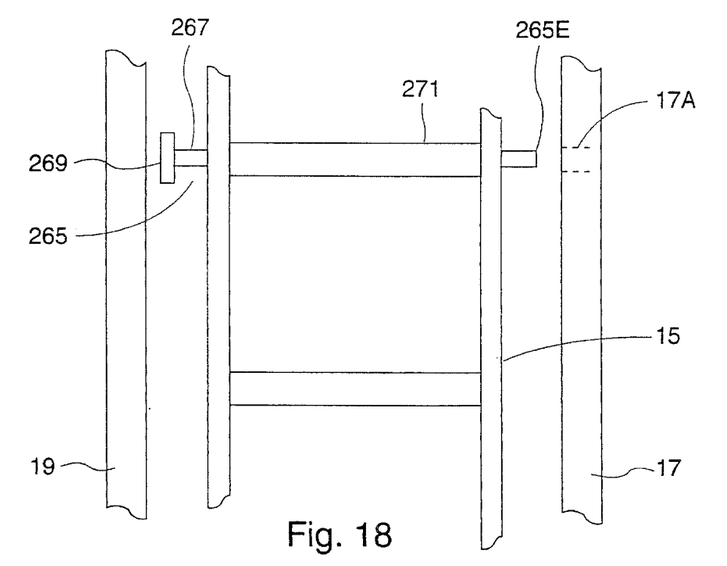
FIG. 18 is a rear view of the ladder in an upright position between the ladder supports with the support bar in a retracted position.
Figure 19:
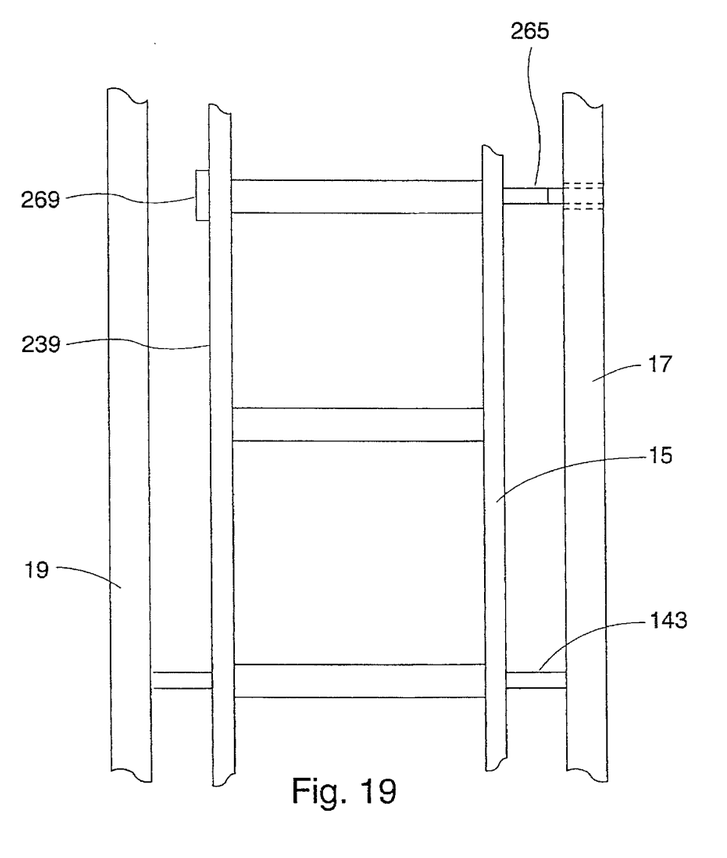
FIG. 19 is a rear view of the ladder in an upright position between the ladder supports with the support bar in an inserted stopping position.

As shown in FIGS. 15, 18 and 19, a holding bar 265 is slidably located in the ladder 15 for enabling the ladder 15 to be halted at an upright position when being pivoted between its storage position and its operating position to help control the pivoting motion of the ladder 15. The holding bar 265 has an elongated cylindrical body 267 with an enlarged head 269 integrally coupled at an end of the body 267. The body 267 of the holding bar 265 is slidably located in the rung aperture of a rung 271. The head 269 of the bar 265 is larger then the rung aperture of the rung 271 so the bar 265 cannot be inserted into the rung aperture past the head 269.

As shown in FIGS. 18 and 19, the bar 265 is extendable between a holding position and a pivot position in the rung aperture of the rung 271. In the holding position, as shown in FIG. 19, the head 269 of the bar 265 is located against a leg 239 of the ladder and the end 265E of the bar 265 is located extending into an aperture 17A of the support 17, preventing movement of the ladder relative to the supports 17 and 19.

In the pivot position, as shown in FIG. 18, the bar 265 is located in a fully retracted position allowing the ladder to pivot relative to section 166 of the supports 17 and 19.

Referring now to FIGS. 1–5, operation of the ladder apparatus 11 will be described. The ladder apparatus 11 is normally located in its storage position on the vehicle 13 (FIG. 1) for transportation with the vehicle 13. When the ladder apparatus 11 is needed, the ladder supports 17 and 19 are pulled out of the tubes 26 and 27 and positioned to support the ladder 15, which is rolled off of the mounting brackets 23 and 25 to be located against a surface 241 (FIG. 5).

The ladder supports 17 and 19 are slidably removed from the tubes 26 and 27 by grasping the ladder support 17 and 19 rearward of the rear ends 147 of the tubes 26 and 27 and pulling the ladder supports out of the tubes. The tubes 26 and 27 may be jostled vertically about the front mounting bracket 23 to loosen the ladder supports 17 and 19 in the tubes if the ladder supports 17 and 19 become stuck in the tubes. As shown in FIGS. 2 and 3, the rear sections 166 of the ladder supports 17 and 19 pivot towards the ground 167 as the ladder supports are pulled out of the tubes 26 and 27 until the feet 169 of the rear sections 166 are located on the ground 167. The sections 164 and 166 lock together when the feet 169 are located on the ground 167 and the rear sections 166 are located at right angles to the front sections 164. The hinged stop 225 may be located in position to block forward movement of the ladder support 17 to prevent the ladder supports 17 and 19 from sliding in the tubes 26 and 27 when the ladder 15 is in use.

The ladder 15 is pulled from its storage position by the pivot bar 143 coupled to the ladder supports 17 and 19 as the ladder supports are pulled out of the tubes 26 and 27. The ladder 15 is pulled out of the tubes 26 and 27. The ladder 15 is pulled rearward relative to the vehicle 13 across the rollers 67 and 107 of the mounting brackets 23 and 25. As shown in FIGS. 2 and 3, the lower end 243 of the ladder 15 is pulled downward behind the vehicle 13 as the rear sections 166 are moved towards the ground 167. The ladder 15 pivots about the roller 107 of the rear mounting bracket 25 as the lower end 243 of the ladder 15 is pulled downward.

Referring to FIGS. 3–5, after the ladder supports 17 and 19 are located in place on the ground 167, the ladder 15 is positioned against a supporting surface 241. The ladder 15 is pivoted about the pivot bar 143 to move the ladder 15 through the ladder supports 17 and 19 to locate the upper end 275 of the ladder against the surface 241. The ladder 15 may then be climbed.

If desired, the pivot motion of the ladder 15 may be controlled by stopping the ladder in a vertical upright position with the bar 265, as shown in FIG. 4. Before pulling the ladder 15 to an upright position, the bar 265 is pushed into the aperture 17A of the support 17. As shown in FIG. 19, the extended bar 265 halts the ladder 15 in its upright position by preventing the ladder from rotating through the ladder supports 17 and 19. The bar 265 may then be pulled from the aperture 17A to its retracted position and the ladder 15 may be moved into place against the supporting surface 241.

After the ladder 15 has been used, the ladder and ladder supports 17 and 19 are repositioned in their storage positions. The ladder is pivoted through the ladder supports 17 and 19 away from the supporting surface 241 onto the roller 107 of the rear mounting bracket 25. The hinged stop 225 is removed from its blocking position in the tube 26 so the ladder supports 17 and 19 may be moved forward in the tubes 26 and 27. The feet sections 166 of the ladder supports 17 and 19 are lifted off the ground 167 to unlock the sections 164 and 166, and the ladder supports 17 and 19 are pushed into the tubes 26 and 27 while pivoting the rear sections 166 upwards. The ladder 15 is rolled onto the mounting brackets 23 and 25 by moving the ladder supports 17 and 19 into the tubes 26 and 27.

The locking wheel 169W of FIG. 21 is a conventional locking wheel, having a lever 169L which when pushed down at one end 169L1 locks the wheel relative to its axis preventing it from rotating. The wheel can be released to allow it to roll by pushing down at the opposite end 169L2 of the lever.

The foregoing disclosure and the showings made in the drawings are merely illustrative of the principles of this invention and are not to be interpreted in a limiting sense.

I claim:

1. A vehicle mounted ladder apparatus, comprising:

mounting brackets adapted to be secured to a roof of a vehicle;

two elongated tubes mounted in said mounting brackets extending parallel to each other to be located lengthwise along the roof of the vehicle;

two elongated supports, each support being removably located in a respective elongated tube, each support having front and rear sections that are pivotally coupled together;

a ladder to be removably mounted on said mounting brackets between said elongated supports, said ladder having an engaging end and a portion spaced from said engaging end, pivotally coupled to said rear sections of said supports, said supports and ladder cooperatively having a storage position and an operating position, where said supports and said ladder slidably extend between said storage position and said operating position;

in said storage position said supports are located substantially within said elongated tubes with said front and rear sections extending in said tubes, and said ladder is located on said mounting brackets extending lengthwise over the roof of the vehicle;

in said operating position said supports are located substantially out of said elongated tubes rearward of said vehicle, said rear section of each support extending from its respective tube rearward of said vehicle, said rear section of each support extending transverse to its respective front section and having a support end supported by the ground spaced rearward of the vehicle to allow said ladder to be located upwardly with said engaging end supported against a structure of interest.

2. The apparatus of claim 1, wherein each support comprises:

a foot located at the support end of its rear section with a rod coupled to said foot extending lengthwise through said rear section from said foot, said rod and said foot are moveably coupled to said rear section to move lengthwise relative to said rear section;

said front section includes a rod receiving aperture extending transversely therein, said rod receiving aperture being located adjacent to said rear section for receiving an end of said rod when said support is located in its operating position with said rear section positioned transverse to said front section;

a first stop coupled to said rod;

a second stop coupled to said rear section near said first stop;

a spring member compressibly located between said first stop and said second stop, said spring member being structured and arranged to bias said end of said rod away from said front section to normally maintain said end of said rod out of said rod receiving apertures until said rear section is located in its operating position with said foot resting on the ground to allow said rear section to pivot relative to said front section between its storage and operating positions;

said rod being located in said rod aperture when said foot is located on said ground surface to lock said first and second sections in a transverse orientation to support said ladder.

3. The apparatus of claim 1, wherein:

each of said elongated tubes has a slot extending through the wall thereof lengthwise of said tube;

a pivot bar pivotally couples said ladder to said rear section of each of said supports, said pivot bar being located to extend through said slots to allow said supports to move in said tubes.

4. The apparatus of claim 3, wherein:

said ladder has a plurality of tubular rungs;

said pivot bar extends through a rung of said ladder to pivotally couple said ladder to said rear sections of said supports.

5. The portable ladder apparatus of claim 1, wherein:

a wheel is coupled to said front section of each support at a forward end of said front section opposite said rear section to permit said supports to be rolled through said tubes;

a roller is coupled to a bottom edge of each tube at a rear end of said tubes to permit each support to be rolled out said rear end of its respective tube.

6. The apparatus of claim 1, wherein:

each mounting bracket is comprised of a roller member and a pair of tube supports, said roller member being rotatably coupled extending between each tube support;

said ladder is slidably locatable on said roller members;

each elongated tube is supported by a respective tube support.

7. The apparatus of claim 1, wherein:

said mounting brackets comprise a forward mounting bracket securable to a forward portion of said vehicle roof and a rear mounting bracket securable to a rear portion of said vehicle roof;

each of said elongated tubes is pivotally attached to said forward mounting bracket by a pivot pin;

each of said elongated tubes is liftably retained within said rear mounting bracket.

8. The apparatus of claim 1, further comprising:

a forward stop hingedly coupled to one of said elongated tube, said forward stop comprising a blocking member coupled to a hinge member;

said one elongated tube has a forward stop aperture located extending therethrough adjacent said forward stop;

said hinge member is coupled to said one tube adjacent said forward stop aperture positioned to removably locate said blocking member through said forward stop aperture;

said blocking member is locatable adjacent said forward end of said front support in said one tube blocking forward movement of said support in said one tube when said support is in said operating position and said blocking member is located in said forward stop aperture.

9. The apparatus of claim 1, comprising:

a bar movably coupled to said ladder for movement between a release position to allow said ladder to pivot relative to said rear section of said supports and a stop position for preventing said ladder from pivoting relative to said rear sections of said supports.

10. The apparatus of claim 1, wherein:

in said operating position of said supports, said support ends of said rear sections of said supports are positioned on said ground surface spaced apart from a rear of the vehicle a sufficient distance to permit unobstructed access to said rear of the vehicle;

said ladder extends upwards in its operating position spaced from the rear of the vehicle a sufficient distance to permit unobstructed access to the rear of the vehicle.

11. The apparatus of claim 1, further comprising:

a securing member for removably coupling said ladder to said rear sections of said supports when said supports and ladder are located in said operating position to secure said ladder in its operating position.

12. The apparatus of claim 1, comprising:

wheels coupled to said support ends of said rear section for engaging the ground when said supports are in their operating positions.

13. The apparatus of claim 3, comprising:

a bar movably coupled to said ladder for movement between a release position to allow said ladder to pivot relative to said rear section of said supports and a stop position for preventing said ladder from pivoting relative to said rear sections of said supports.

14. The apparatus of claim 2, comprising:

a bar movably coupled to said ladder for movement between a release position to allow said ladder to pivot relative to said rear section of said supports and a stop position for preventing said ladder from pivoting relative to said rear sections of said supports.

15. The apparatus of claim 1, comprising:

a foot located at the support end of its rear section with a rod coupled to said foot extending lengthwise through said rear section from said foot, said rod and said foot are moveably coupled to said rear section to move lengthwise relative to said rear section;

said front section includes a rod receiving aperture extending transversely therein, said rod receiving aperture being located adjacent to said rear section for receiving an end of said rod when said support is located in its operating position with said rear section positioned transverse to said second section;

biasing means for biasing said end of said rod away from said front section to normally maintain said end of said rod out of said rod receiving apertures until said rear section is located in its operating position with said foot resting on the ground to allow said rear section to pivot relative to said front section between its storage and operating positions;

said rod being located in said rod aperture when said foot is located on said ground surface to lock said first and second sections in a transverse orientation to support said ladder.

16. The apparatus of claim 15, comprising:

a bar movably coupled to said ladder for movement between a release position to allow said ladder to pivot relative to said rear section of said supports and a stop position for preventing said ladder from pivoting relative to said rear sections of said supports.

\* \* \* \* \*